(12) United States Patent
Noh

(10) Patent No.: US 10,953,909 B2
(45) Date of Patent: Mar. 23, 2021

(54) STEERING COLUMN FOR VEHICLE

(71) Applicants: HYUNDAI MOTOR COMPANY, Seoul (KR); KIA MOTORS CORPORATION, Seoul (KR)

(72) Inventor: Byung Woo Noh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 82 days.

(21) Appl. No.: 16/425,732

(22) Filed: May 29, 2019

(65) Prior Publication Data
US 2020/0255051 A1    Aug. 13, 2020

(30) Foreign Application Priority Data

Feb. 12, 2019    (KR) .................. 10-2019-0016087

(51) Int. Cl.
*B62D 1/19*    (2006.01)
*B62D 1/187*    (2006.01)

(52) U.S. Cl.
CPC ............. *B62D 1/192* (2013.01); *B62D 1/187* (2013.01)

(58) Field of Classification Search
CPC ........ B62D 1/192; B62D 1/187; B62D 1/197; B62D 1/195
See application file for complete search history.

(56) References Cited

U.S. PATENT DOCUMENTS

| | | | | |
|---|---|---|---|---|
| 4,022,495 A * | 5/1977 | Pizzocri | ................. | B62D 1/195 280/750 |
| 5,181,435 A * | 1/1993 | Khalifa | ................... | B62D 1/195 248/900 |
| 6,523,432 B1 * | 2/2003 | Yamamoto | ............. | B62D 1/195 280/777 |
| 6,685,225 B2 * | 2/2004 | Hancock | ................ | B62D 1/195 280/777 |
| 7,942,446 B2 * | 5/2011 | Ridgway | ................ | B62D 1/195 280/777 |
| 8,540,280 B2 * | 9/2013 | Ishii | ........................ | B62D 1/195 280/777 |
| 2016/0332658 A1 * | 11/2016 | Taenaka | ................. | F16H 55/283 |
| 2019/0031225 A1 * | 1/2019 | Kurokawa | ............. | B62D 1/184 |

FOREIGN PATENT DOCUMENTS

KR    10-2014-0073844 A    6/2014

* cited by examiner

*Primary Examiner* — Ruth Ilan
*Assistant Examiner* — Mary E Young
(74) *Attorney, Agent, or Firm* — Morgan, Lewis & Bockius LLP

(57) ABSTRACT

A steering column for a vehicle may include a lower column; and an upper column with a lower end portion thereof being fitted into the lower column to slidably overlap the lower column, and with an upper end portion of the upper column coupled to a steering wheel, wherein the upper column may include a guide slot, which extends in the same direction as a direction in which colliding force, generated in a collision, is applied, and wherein a tilt bolt is disposed to extend through the guide slot.

11 Claims, 5 Drawing Sheets

STEERING COLUMN FOR VEHICLE

CROSS-REFERENCE TO RELATED APPLICATION

The present application claims priority to Korean Patent Application No. 10-2019-0016087, filed on Feb. 12, 2019 in the Korean Intellectual Property Office, the entire contents of which is incorporated herein for all purposes by this reference.

BACKGROUND OF THE INVENTION

Field of the Invention

The present invention relates to a steering column for a vehicle, and more particularly to a steering column for a vehicle in which a direction in which colliding force is applied to the steering column in the event of a collision is set to coincide with a collapsing direction of the steering column to allow smooth collapse of the steering column in the early stage of a collision.

Description of Related Art

In general, a steering column for a vehicle is configured such that a steering wheel is mounted on the upper end portion of the steering column and a gear box is connected to the lower end portion of the steering column to transmit a steering force from a driver to two wheels.

Furthermore, the steering column is basically provided with an impact absorption function, which is fulfilled such that the steering column is divided into an upper portion and a lower portion such that the overall length of the steering column is shortened to absorb impact and thus to reduce injury to the driver when a driver collides with a steering wheel in the event of a collision.

In other words, when the upper body of the driver collides with the steering wheel owing to the impact which is generated in the event of a collision, an upper column moves toward a lower column, and thus the overall length of the steering column is shortened. The shortening action of the steering column absorbs the impact which is generated when the upper body of the driver collides with the steering wheel, reducing injury to the driver.

In a conventional steering column, because the direction in which colliding force generated by the collision of the upper body of a driver with a steering wheel does not coincide with the direction in which the steering column collapses due to the colliding force (contraction direction), smooth collapse of the steering column is not achieved in the early stage of a collision, worsening injury to the driver.

In the event of a collision, the upper body of the driver moves forwards in a horizontal direction and collides with a steering wheel due to inertial force, and thus the colliding force applied to the steering column is directed in a forward horizontal direction thereof.

The steering column is oriented in an anteroposterior direction such that the front portion thereof is positioned at a lower level and the rear portion thereof, which surfaces the driver is positioned at a higher level. Consequently, the collapsing direction of the steering column is inclined forwards and downwards.

Consequently, because the direction of the colliding force applied to the steering column, which is directed forward in a horizontal direction thereof, does not coincide with the collapsing direction of the steering column, which is inclined forwards and downwards, smooth collapse of the steering column is not fulfilled in the early stage of a collision, worsening injury to the driver due to the steering column.

Furthermore, because the direction of the colliding force applied to the steering column and the collapsing direction of the steering column does not coincide with each other, a jamming phenomenon between components of the steering column occurs during the collapse of the steering column, and thus the durability of the components deteriorates due to the jamming phenomenon occurring between the components.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a steering column for a vehicle in which the direction in which the colliding force, which is generated when an upper body of a driver collides with a steering wheel in the event of a collision, is applied coincides with the direction in which the steering column collapses owing to the colliding force, allowing smooth collapse of the upper column in the early stage of a collision and thus preventing injury to the driver from being worsened owing to the steering column.

Various aspects of the present invention are directed to providing a steering column for a vehicle, which is configured to prevent a jamming phenomenon occurring between components forming the steering column when an upper column moves in a collapsing direction thereof, by the coincidence of the direction of colliding force with the collapsing direction thereof, increasing the durability of the components.

It is a further object of the present invention to provide a steering column for a vehicle, which is configured to efficiently disperse impact in a collision.

In various aspects of the present invention, a steering column for a vehicle according to an exemplary embodiment of the present invention may include a lower column and an upper column, with a lower end portion thereof being fitted into the lower column to slidably overlap the lower column, and with an upper end portion of the upper column coupled to a steering wheel, wherein the upper column includes a guide slot, which extends in the same direction as the direction in which colliding force generated in the event of a collision is applied, and wherein a tilt bolt is disposed to extend through the guide slot.

The steering column may further include a teleguide, which is coupled to the tilt bolt and is brought into surface-contact with the guide slot to guide the upper column in a collapsing direction in the early stage of a collision.

The tilt bolt may extend through the teleguide and is integrally coupled to the teleguide, and the teleguide may have flat regions, which are respectively brought into surface-contact with upper and lower inner surfaces of the guide slot.

The surface-contact between the upper and lower inner surfaces of the guide slot and the flat regions of the teleguide may be continuously maintained even when the teleguide is pressed during movement of the upper column in the collapsing direction thereof.

The teleguide may be made of a plastic material to reduce weight and friction with the guide slot.

The teleguide may be made of a plastic material to reduce weight, and thin plates, which are made of the same aluminum as the material of the upper column, may be coupled to the flat regions of the teleguide to reduce friction with the guide slot.

In various aspects of the present invention, a steering column for a vehicle according to an exemplary embodiment of the present invention may include a lower column and an upper column, wherein the direction in which colliding force, which is generated when a driver collides with a steering wheel in the early stage of a collision, is applied coincides with a collapsing direction in which the upper column moves toward the lower column due to the colliding force.

Any of the direction in which the colliding force is applied and the collapsing direction of the steering column may be a forward horizontal direction thereof.

The upper column may have a guide slot formed to extend in an anteroposterior horizontal direction thereof, wherein a tilt bolt may extend through the guide slot, and a teleguide may be coupled to the tilt bolt and may be brought into surface-contact with the guide slot, and wherein the upper column may move in the collapsing direction thereof, which is an anteroposterior horizontal direction thereof, in the state in which the guide slot and the teleguide are in surface-contact with each other in the early stage of a collision.

As is apparent from the above description, since the steering column according to an exemplary embodiment of the present invention is configured such that the guide slot formed in the upper column extends in the same direction as the direction of colliding force such that the direction of colliding force coincides with the collapsing direction of the upper column, it is possible to eliminate a phenomenon whereby the teleguide is jammed into the guide slot in the early stage of a collision and thus to allow the upper column to more smoothly move in the collapsing direction thereof. As a result, there is an advantage of preventing injury to the driver from being worsened owing to the steering column in the event of a collision.

Furthermore, the present invention is configured to prevent the phenomenon whereby the teleguide is jammed into the guide slot when the upper column moves in the collapsing direction thereof, by the coincidence of the direction of colliding force with the collapsing direction thereof, providing an advantage of increasing the durability of the components.

Various aspects of the present invention are directed to providing an advantage of realizing more smooth movement of the upper column in the collapsing direction in the early stage of a collision by the surface-contact between the guide slot and the teleguide, various aspects of the present invention are directed to providing an advantage of allowing smooth movement of the upper column in the collapsing direction by the surface-contact between the guide slot and the teleguide even when the direction of colliding force does not coincide with the collapsing direction due to the collision.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
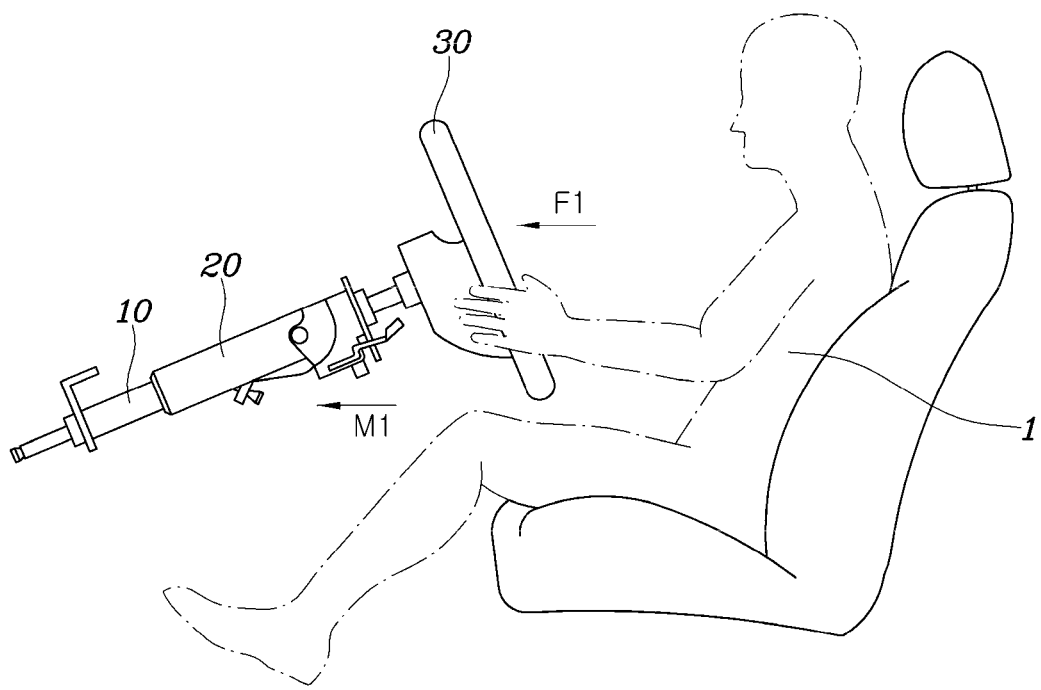
FIG. 1 is a view showing a steering column according to an exemplary embodiment of the present invention, in which a direction of colliding force coincides with a collapsing direction thereof.
Figure 2:
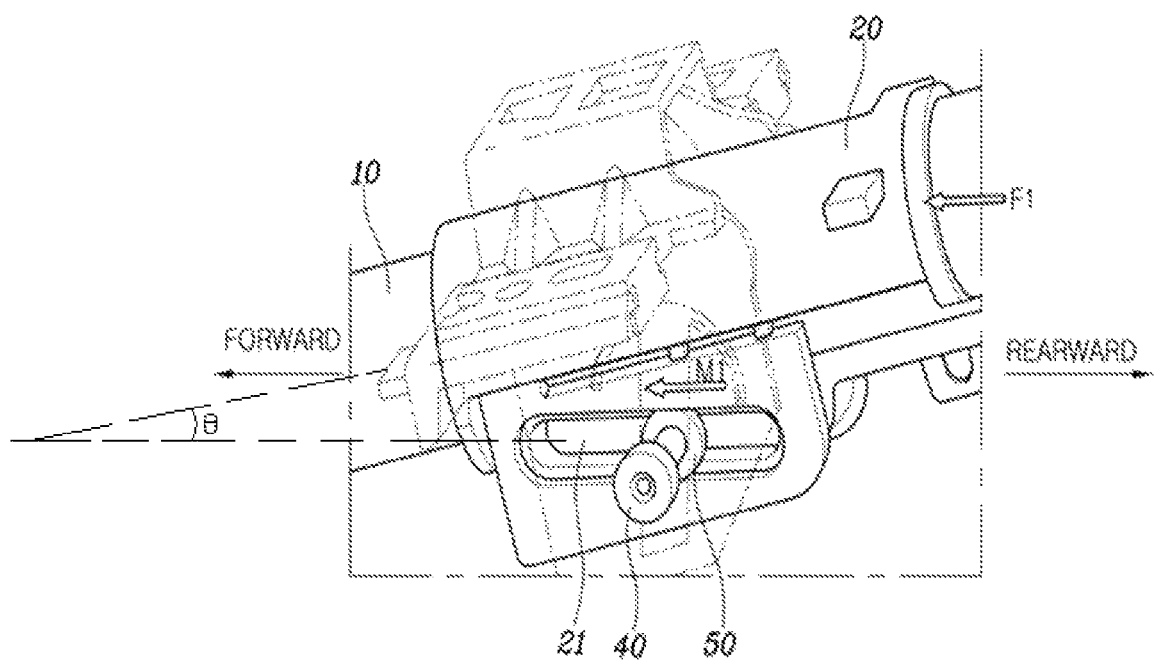
FIG. 2 is an enlarged view of a portion of an upper column shown in FIG. 1, in which a guide slot is formed.
Figure 3:
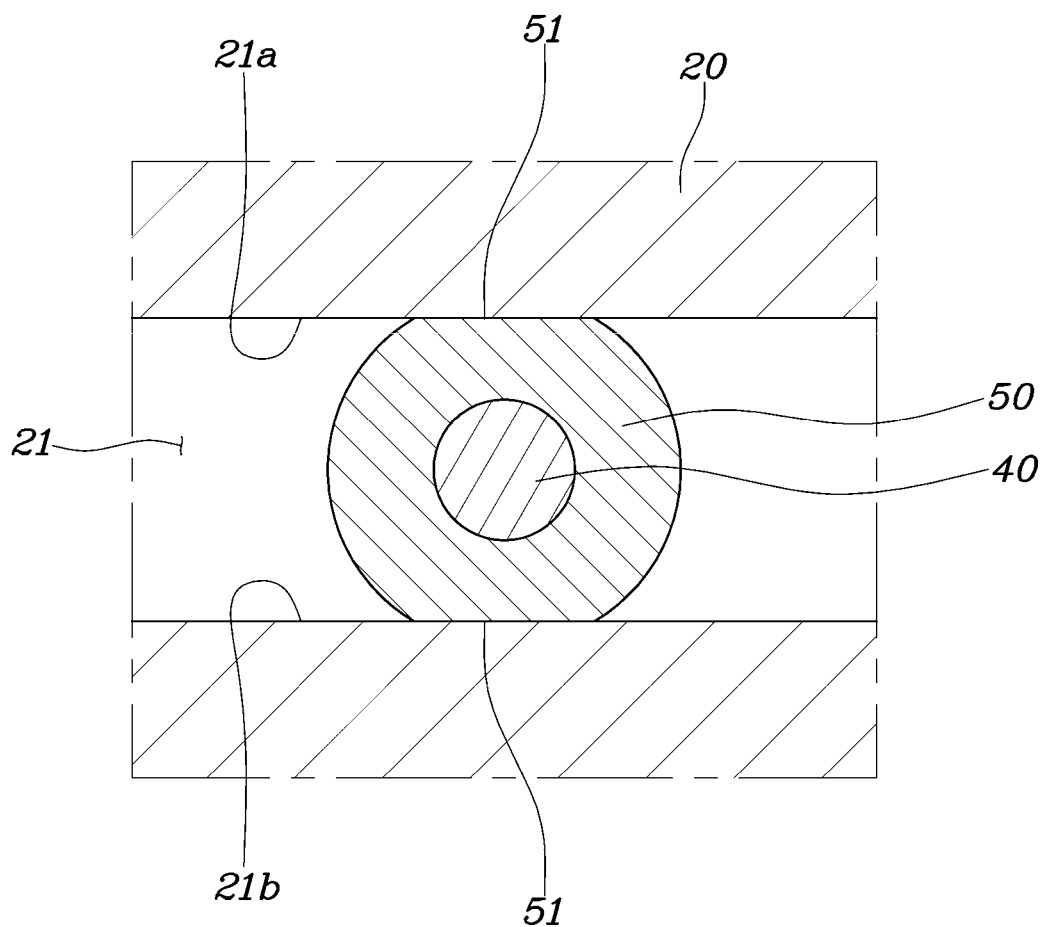
FIG. 3 is a front view of FIG. 2.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a steering column according to an exemplary embodiment of the present invention will be described with reference to the accompanying drawings.

As illustrated in FIG. 1, FIG. 2, FIG. 3, FIG. 4, and FIG. 5, the steering column according to the exemplary embodiment of the present invention includes a lower column 10 and an upper column 20.

The lower end portion of the lower column 10 is connected to a gear box, and the upper end portion of the lower column 10 is fitted into the lower end portion of the upper column 20 to overlap the lower end. The upper end portion of the upper column 20 is coupled to a steering wheel 30.

In the event of a collision, the upper body of a driver 1 collides with the steering wheel 30 due to the inertial force. Owing to the colliding force F1, which is caused by the collision of the upper body of the driver 1 with the steering wheel 30, the upper column 20 moves toward the lower column 10 in the collapsing direction M1, shortening the overall length of the steering column. By the shortening action of the steering column, the impact, which is generated when the upper body of the driver 1 collides with the steering wheel 30, is absorbed, reducing injury to the driver.

Since a structure configured for shortening the length of the steering column in the event of a collision is well-known in the art, a description thereof will be omitted.

The exemplary embodiment of the present invention is characterized in that the direction in which the colliding force F1, which is generated by the collision of the upper body of the driver 1 with the steering wheel 30, is applied coincides with the collapsing direction M1 in which the upper column 20 moves toward the lower column 10 due to the colliding force F1.

To realize the present construction, according to an exemplary embodiment of the present invention, a guide slot 21 is formed in the upper column 20, and a tilt bolt 40 extends through the guide slot 21. In the present structure, the present invention is characterized in that the guide slot 21 extends in the same direction as the direction in which the colliding force F1 is applied and in that a teleguide 50 coupled to the tilt bolt 40 is brought into surface-contact with the guide slot 21.

In an exemplary embodiment of the present invention, the tilt bolt 40 is connected to a vehicle body so that the guide slot 21 slides on the teleguide 50 coupled to the tilt bolt 40.

When the colliding force F1, which is generated by collision of the upper body of the driver 1 with the steering wheel 30 in the event of a collision, is transmitted to the upper column 20, the upper column 20 moves forwards in the collapsing direction M1, which is the same as the direction of the colliding force F1 in the state in which the teleguide 50 is in surface-contact with the guide slot 21. The teleguide 50 is configured to guide the movement of the upper column 20 in the collapsing direction M1 in the early stage of a collision.

When the guide slot 21 formed in the upper column 20 extends in the same direction as the direction of the colliding force F1 such that the direction of the colliding force F1 coincides with the collapsing direction M1 of the upper column 20, it is possible to eliminate a phenomenon whereby the teleguide 50 is jammed into the guide slot 21 in the early stage of a collision and thus to allow the upper column 20 to more smoothly move in the collapse direct M1. As a result, there is an advantage of preventing the injury to the driver from being worsened owing to the steering column in the event of a collision.

Furthermore, since it is possible to prevent the phenomenon whereby the teleguide 50 is jammed into the guide slot 21 when the upper column 20 moves in the collapsing direction M1, by the coincidence of the direction of the colliding force F1 with the collapsing direction M1, there is an advantage of increasing the durability of the components.

Furthermore, the present invention is characterized in that the teleguide 50 is brought into surface-contact with the guide slot 21. When the teleguide 50 and the guide slot 21 are configured to be brought into surface-contact with each other in the present way, the contour of the teleguide 50 is not easily deformed even when the teleguide 50 is pressed upon movement of the upper column 20 in the collapsing direction M1. Consequently, the guide slot 21 and the teleguide 50 are continuously maintained in the state of being in surface-contact with each other, and thus it is possible to allow the upper column 20 to more smoothly move in the collapsing direction M1 by the surface-contact between the guide slot 21 and the teleguide 50 in the early stage of a collision.

Furthermore, the surface-contact between the guide slot 21 and the teleguide 50 offers an advantage of realizing smooth movement of the upper column 20 in the collapsing direction M1 even when the direction of the colliding force F1 does not coincide with the collapsing direction M1 due to the collision.

In an exemplary embodiment of the present invention, the longitudinal axis of the upper column 20 is positioned to be inclined with a predetermined acute angle Θ from the longitudinal axis of the guide slot 21 which is horizontally aligned such that the collapsing direction M1 is substantially in parallel with the longitudinal axis of the guide slot 21.

According to an exemplary embodiment of the present invention, the tilt bolt 40 extends through the center portion of the teleguide 50, which has a circular shape, and is integrally formed with the teleguide 50. Since a flat region 51 is formed on each of the upper and lower end portions of the external peripheral surface of the teleguide 50, the flat regions 51 are respectively brought into surface-contact with the upper surface 21a and the lower surface 21b of the guide slot 21.

Figure 4:
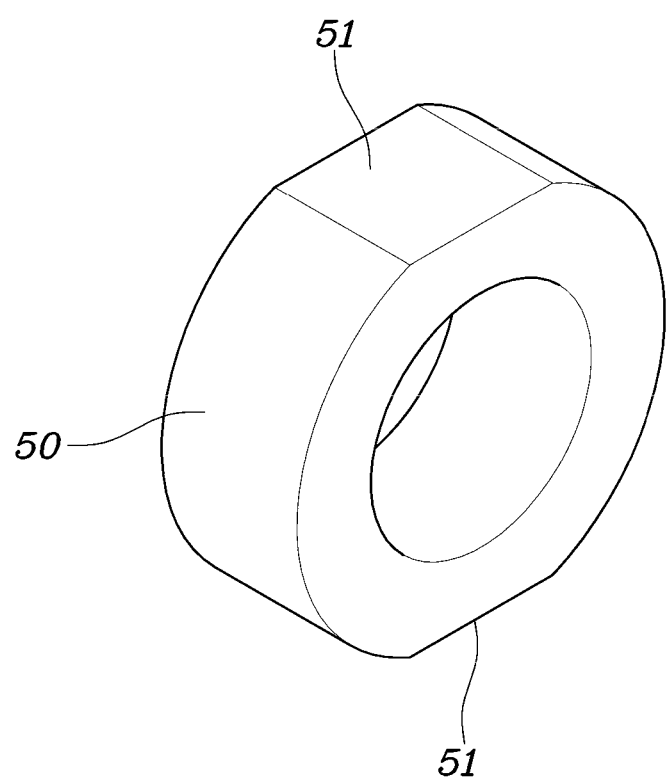
FIG. 4 and FIG. 5 are views showing a teleguide according to an exemplary embodiment of the present invention.

The upper column 20, which has the guide slot 21 formed therein, is made of an aluminum material with the aim of reducing the weight and improving the durability thereof, and the teleguide 50 is made of a plastic material with the aim of reducing the friction with the guide slot 21. In the instant case, the flat regions 51 formed on the upper and lower end portions of the teleguide 50, which are respectively brought into surface-contact with the upper surface 21a and the lower surface 21b of the guide slot 21, are configured as illustrated in FIG. 4.

Figure 5:
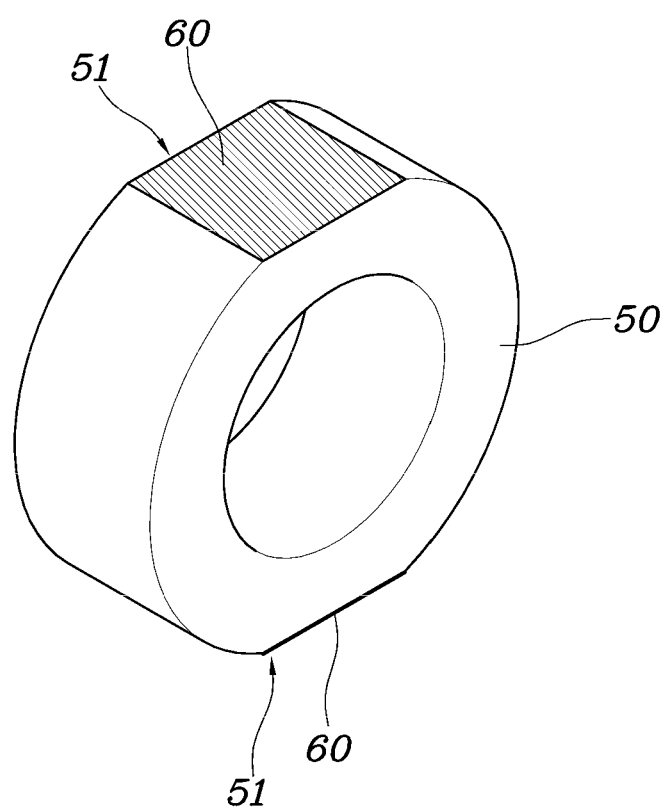

In another exemplary embodiment of the present invention, the upper column 20, which has the guide slot 21 formed therein, and the teleguide 50 may be made of the aluminum material and the plastic material as described above but thin plates 60, which are made of the aluminum material, which is the same material as the material of the upper column 20, may be coupled to the flat regions 51 of the teleguide 50 to reduce friction with the guide slot 21, as illustrated in FIG. 5.

As described above, since the steering column according to an exemplary embodiment of the present invention is configured such that the guide slot 21 formed in the upper column 20 extends in the same direction as the direction of colliding force F1 such that the direction of colliding force F1 coincides with the collapsing direction M1 of the upper column 20, it is possible to eliminate a phenomenon whereby the teleguide 50 is jammed into the guide slot 21 in the early stage of a collision and thus to allow the upper column 20 to more smoothly move in the collapse direct M1. As a result, there is an advantage of preventing the injury to the driver from being worsened owing to the steering column in the event of a collision.

Furthermore, the present invention is configured to prevent the phenomenon whereby the teleguide 50 is jammed into the guide slot 21 when the upper column 20 moves in the collapsing direction M1, by the coincidence of the direction of colliding force F1 with the collapsing direction M1, providing an advantage of increasing the durability of the components.

Various aspects of the present invention are directed to providing an advantage of realizing more smooth movement of the upper column 20 in the collapsing direction M1 in the early stage of a collision by surface-contact between the guide slot 21 and the teleguide 50. Various aspects of the present invention are directed to providing an advantage of allowing smooth movement of the upper column 20 in the collapsing direction M1 by surface-contact between the guide slot 21 and the teleguide 50 even when the direction of colliding force F1 does not coincide with the collapsing direction M1 due to the collision.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A steering column for a vehicle, the steering column comprising:
   a lower column; and
   an upper column,
   wherein a lower end portion of the upper column is fitted into the lower column to slidably overlap the lower column, and an upper end portion of the upper column is coupled to a steering wheel,
   wherein the upper column includes a guide slot, which extends in a same direction as a direction in which colliding force generated in a collision of the vehicle, is applied,
   wherein a tilt bolt is disposed to extend through the guide slot,
   wherein the steering column further includes a teleguide, which is coupled to the tilt bolt and is brought into contact with the guide slot to guide the upper column in a collapsing direction in the collision of the vehicle,
   wherein the tilt bolt extends through the teleguide and is integrally coupled to the teleguide,
   wherein the teleguide has at least a flat region, which is brought into contact with at least one of upper and lower inner surfaces of the guide slot,
   wherein a plate is coupled to the at least a flat region of the teleguide to be positioned between the teleguide and the guide slot, and
   wherein the plate is of a same material as a material of the upper column.

2. The steering column for the vehicle according to claim 1,
   wherein a longitudinal axis of the guide slot is positioned to extend in an anteroposterior horizontal direction, and
   wherein a longitudinal axis of the upper column is positioned to be inclined with a predetermined acute angle from the longitudinal axis of the guide slot.

3. The steering column for the vehicle according to claim 1,
   wherein a longitudinal axis of the guide slot is positioned to extend in an anteroposterior horizontal direction, and
   wherein a longitudinal axis of the upper column is positioned to be inclined with a predetermined acute angle from the longitudinal axis of the guide slot.

4. The steering column for the vehicle according to claim 1,
   wherein the contact between the at least one of the upper and lower inner surfaces of the guide slot and the at least a flat region of the teleguide is continuously maintained while the teleguide is pressed during movement of the upper column in the collapsing direction.

5. The steering column for the vehicle according to claim 1,
   wherein the teleguide is made of a plastic material.

6. The steering column for the vehicle according to claim 1,
   wherein the plate and the upper column are made of aluminum.

7. A steering column for a vehicle comprising a lower column and an upper column,
   wherein a direction in which colliding force which is generated when a driver collides with a steering wheel in a collision of the vehicle is applied, coincides with a collapsing direction in which the upper column moves toward the lower column due to the colliding force,
   wherein the direction in which the colliding force is applied and the collapsing direction of the steering column are a forward horizontal direction of the steering column,
   wherein the upper column includes a guide slot formed to extend in an anteroposterior horizontal direction,
   wherein a tilt bolt is disposed to extend through the guide slot, and a teleguide is coupled to the tilt bolt and is brought into contact with the guide slot,
   wherein the upper column moves in the collapsing direction, which is the anteroposterior horizontal direction, in a state in which the guide slot and the teleguide are in contact with each other in the collision of the vehicle,
   wherein the teleguide has at least a flat region, which is brought into contact with at least one of upper and lower inner surfaces of the guide slot,
   wherein a plate is coupled to the at least a flat region of the teleguide to be positioned between the teleguide and the guide slot, and
   wherein the plate is of a same material as a material of the upper column.

8. The steering column for the vehicle according to claim 7,
   wherein a longitudinal axis of the guide slot is positioned to extend in the anteroposterior horizontal direction, and
   wherein a longitudinal axis of the upper column is positioned to be inclined with a predetermined acute angle from the longitudinal axis of the guide slot.

9. The steering column for the vehicle according to claim 7,
   wherein the contact between the at least one of the upper and lower inner surfaces of the guide slot and the at least a flat region of the teleguide is continuously maintained while the teleguide is pressed during movement of the upper column in the collapsing direction.

10. The steering column for the vehicle according to claim 9,
    wherein the teleguide is made of a plastic material.

11. The steering column for the vehicle according to claim 7,
    wherein the plate and the upper column are made of aluminum.

* * * * *